(12) United States Patent
Kobayashi et al.

(10) Patent No.: US 9,714,683 B2
(45) Date of Patent: Jul. 25, 2017

(54) FRICTION PLATE AND WET-TYPE MULTIPLE-DISC CLUTCH WITH FRICTION PLATE

(71) Applicant: NSK-WARNER K.K., Shinagawa-ku, Tokyo (JP)

(72) Inventors: Masato Kobayashi, Fukuroi (JP); Tomoyuki Miyazaki, Fukuroi (JP); Shinichi Natsumeda, Fujisawa (JP)

(73) Assignee: NSK-WARNER K.K., Tokyo (JP)

( * ) Notice: Subject to any disclaimer, the term of this patent is extended or adjusted under 35 U.S.C. 154(b) by 33 days.

(21) Appl. No.: 14/803,057

(22) Filed: Jul. 18, 2015

(65) Prior Publication Data

US 2016/0025158 A1   Jan. 28, 2016

(30) Foreign Application Priority Data

Jul. 23, 2014   (JP) .................................. 2014-149484

(51) Int. Cl.
| | | |
|---|---|---|
| F16D 13/74 | (2006.01) | |
| F16D 13/52 | (2006.01) | |
| F16D 13/64 | (2006.01) | |
| F16D 25/0638 | (2006.01) | |
| F16D 25/12 | (2006.01) | |
| F16D 65/12 | (2006.01) | |
| F16D 69/00 | (2006.01) | |

(52) U.S. Cl.
CPC ............. *F16D 13/74* (2013.01); *F16D 13/52* (2013.01); *F16D 13/648* (2013.01); *F16D 25/0638* (2013.01); *F16D 25/123* (2013.01); *F16D 65/127* (2013.01); *F16D 2069/004* (2013.01); *F16D 2300/10* (2013.01)

(58) Field of Classification Search
CPC ... F16D 13/74; F16D 2069/004; F16D 25/123
See application file for complete search history.

(56) References Cited

U.S. PATENT DOCUMENTS

| | | | |
|---|---|---|---|
| 2007/0102258 A1* | 5/2007 | Miyazaki | .............. F16D 13/648 192/113.36 |
| 2012/0175216 A1 | 7/2012 | Hiramatsu et al. | |
| 2013/0168199 A1 | 7/2013 | Higashijima et al. | |
| 2014/0027236 A1 | 1/2014 | Ando et al. | |
| 2014/0182995 A1 | 7/2014 | Ando et al. | |

FOREIGN PATENT DOCUMENTS

| | | |
|---|---|---|
| EP | 1 783 389 A2 | 5/2007 |
| JP | 2001-295859 A | 10/2001 |
| JP | 2005-076759 A | 3/2005 |
| JP | 2008-180314 A | 8/2008 |
| JP | 2009-030663 A | 2/2009 |
| JP | 2010-223342 A | 10/2010 |

OTHER PUBLICATIONS

Office Action, prepared Mar. 31, 2017, in German Patent Application No. 10 2015 213 946.8.

* cited by examiner

*Primary Examiner* — Huan Le

(74) *Attorney, Agent, or Firm* — Shapiro, Gabor and Rosenberger, PLLC

(57) ABSTRACT

A friction plate is formed by annularly fixing a plurality of friction material segments to a substantially annular core plate, and a minute groove is formed on a surface of the friction material segment.

19 Claims, 4 Drawing Sheets

FRICTION PLATE AND WET-TYPE MULTIPLE-DISC CLUTCH WITH FRICTION PLATE

BACKGROUND OF THE INVENTION

Field of the Invention

The present invention relates to a friction plate used in a clutch or a brake of an automatic transmission in vehicles, and a wet-type multiple-disc clutch provided with the friction plate.

Description of the Related Art

In general, a wet-type multiple-disc clutch in an automatic transmission has friction plates and separator plates, which are alternately disposed between the drum and the hub of the clutch or a brake, and the clutch is engaged and disengaged by pressing and releasing a clutch piston.

In such a wet-type multiple-disc clutch, there is an occurrence of drag torque leading to a power loss through a lubricant at the time of disengagement of the clutch. Hence, recently, reduction of the drag torque has become a major challenge for automatic transmissions to be compliant with the demand for environmental regulation and low fuel consumption in vehicles.

As a technique in the related art for reducing the drag torque in the friction plate of the wet-type multiple-disc clutch, for example, Japanese Patent Application Laid-Open No. 2005-076759 discloses that a forming groove is provided on a friction member surface of the friction plate, and Japanese Patent Application Laid-Open No. 2008-180314 discloses that a segment shape is adopted to a friction member of the friction plate, and oil is caused to pass through an oil channel between the friction members. Each of the effects (separating and the like) at the time of oil draining has been utilized so as to achieve an effect of reducing the drag torque at a certain variable rotation speed range of an automatic transmission.

While reduction of the drag torque has been highly demanded at the variable rotation speed range, particularly at a low rotation speed range, the countermeasures in the related art have problems described below.

When the forming groove is adopted onto the friction member surface of the friction plate, the groove brings a separating effect between the plates utilizing oil drainage, and the groove provides an effect of reducing the drag torque in the friction plate. However, if the area of the groove for draining oil is increased in order to acquire a better reduction effect, the friction area in the friction plate decreases, thereby resulting in a problem of degradation of heat resistance and durability.

When utilizing the shape of the segment in the friction member, it is possible not only to achieve the separating effect between the plates but also to significantly improve oil drainage and decrease viscous resistance (fluidity) after drainage. Thus, the drag torque is remarkably reduced. However, if the shape of the segment is utilized in order to improve the oil drainage in pursuing a better reduction effect, it is not possible for a lubricant to stably form an oil film on the surface of the friction member, thereby causing fluid shearing resistance hindering the reduction of the drag torque.

Meanwhile, Japanese Patent Application Laid-Open No. 2010-223342 has proposed that an air layer is formed on the surface by providing multiple fine grooves on the surface of the friction member, thereby reducing the drag torque. The disclosure merely presents an idea regarding an effect of reducing the drag torque under a lubricant environment, without mentioning a reduction effect at the variable rotation speed range.

SUMMARY OF THE INVENTION

In consideration of the above-described problems, the present invention aims to provide a friction plate in which a drag torque is able to be reduced at a low rotation speed range, and degradation of heat resistance and durability is prevented by providing minute grooves for avoiding reduction of the area of a friction member in the friction plate of a wet-type multiple-disc clutch.

To this end, a friction plate in accordance with the present invention includes:

a plurality of friction material segments that are annularly fixed to a substantially annular core plate, wherein a drag torque at a low rotation speed range is able to be reduced by providing a minute groove on a surface of the friction material segment.

The present invention provides advantages described below.

By forming the minute groove on the surface of the friction material segment, a surface oil film is able to be ensured between the friction plate and a separator plate. Thus, the drag torque is able to be reduced by reducing fluid shearing resistance. Particularly, the minute groove is effective for reducing the drag torque at a low rotation speed range of equal to or less than 1,000 rotations per minute.

By setting the width of the minute groove to range approximately from 10 μm to 1,000 μm, there is less influence decreasing the friction area of the friction surface in the friction material segment. Thus, sufficient heat resistance and durability is able to be ensured.

Further features of the present invention will become apparent from the following description of exemplary embodiments with reference to the attached drawings.

DESCRIPTION OF THE EMBODIMENTS

Figure 1:
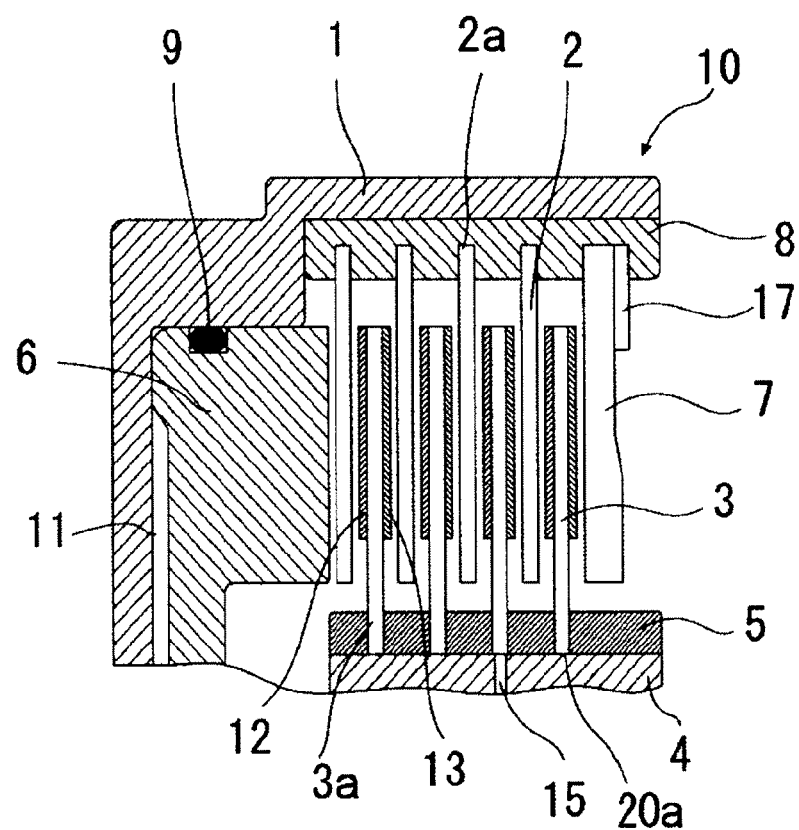
FIG. 1 is a partial sectional view in an axial direction of a wet-type multiple-disc clutch provided with friction plates of the present invention.

The following will describe the present invention in detail with reference to the accompanying drawings. In the drawings, the same components are denoted by the same reference numerals.

FIG. 1 is a partial sectional view in an axial direction of a wet-type multiple-disc clutch 10 provided with friction plates of the present invention. It is possible to apply the friction plates in every embodiment of the present invention.

The wet-type multiple-disc clutch 10 is constituted of a substantially cylindrical clutch drum 1 which is open at one end in the axial direction, a hub 4 which is disposed on an inner periphery of the clutch drum 1 and rotates coaxially and relatively therewith, annular separator plates 2 which are disposed on a spline 8 provided on the inner periphery of the clutch drum 1 so as to be movable in the axial direction, and annular friction plates 3 which are alternately disposed with the separator plates 2 in the axial direction on a spline 5 provided on an outer periphery of the hub 4 and which have friction surfaces to which friction material segments are fixed with an adhesive. Each of the separator plates 2 has a spline portion 2a which engages with the spline 8, and each of the friction plates 3 has a spline portion 3a which engages with the spline 5. A plurality of the friction plates 3 and a plurality of the separator plates 2 are provided.

The wet-type multiple-disc clutch 10 is provided with a piston 6 which presses and fastens the separator plates 2 and the friction plates 3, a backing plate 7 which is provided on the inner periphery of the clutch drum 1 so as to retain the separator plates 2 and the friction plates 3 in a fixed state at one end in the axial direction, and a stopper ring 17 which retains the backing plate 7.

As illustrated in FIG. 1, the piston 6 is disposed so as to be slidable in the axial direction inside the closed end of the clutch drum 1. An O-ring 9 is interposed between the outer peripheral surface of the piston 6 and the inner surface of the clutch drum 1. Furthermore, a sealing member (not illustrated) is interposed between the inner peripheral surface of the piston 6 and the outer peripheral surface of an inner peripheral cylindrical portion (not illustrated) of the clutch drum 1. Thus, a hydraulic chamber 11 in an oil-tight state is defined between the inner surface of the clutch drum 1 at the closed end and the piston 6.

Friction material segments 12 and 13 each of which has a predetermined friction coefficient are respectively fixed to both surfaces of each friction plate 3 retained by the hub 4 so as to be slidable in the axial direction. Alternatively, however, the friction material segments 12 and 13 may be provided on only one side of each friction plate 3. Furthermore, the hub 4 has a lubricant supply port 15 which penetrates through in a radial direction. Through the lubricant supply port 15, a lubricant is supplied from the inner diameter side to the outer diameter side of the wet-type multiple-disc clutch 10.

The wet-type multiple-disc clutch 10 having the foregoing construction exhibits engagement (fastened) and disengagement of the clutch as described below. FIG. 1 illustrates the clutch in a disengaged state in which the separator plates 2 and the friction plates 3 are separated. In the disengaged state, the piston 6 is in contact with the clutch drum 1 on the closed end side due to the urging force of a return spring (not illustrated).

In order to set the disengaged wet-type multiple-disc clutch 10 to be in an engaged state, oil pressure is supplied to the hydraulic chamber 11 defined between the piston 6 and the clutch drum 1. As the oil pressure increases, the piston 6 moves to the right in the axial direction in FIG. 1 against the urging force of the return spring (not illustrated), bringing the separator plates 2 and the friction plates 3 into close contact with each other. Thus, the wet-type multiple-disc clutch 10 is in the engaged state.

In order to cause the wet-type multiple-disc clutch 10 to be disengaged again after the wet-type multiple-disc clutch 10 is set to the engaged state, the oil pressure to the hydraulic chamber 11 is released. Upon releasing of the oil pressure, the piston 6 moves to the position of being in contact with the closed end of the clutch drum 1 due to the urging force of the return spring (not illustrated). In other words, the wet-type multiple-disc clutch 10 is disengaged.

(First Embodiment)

Figure 2:
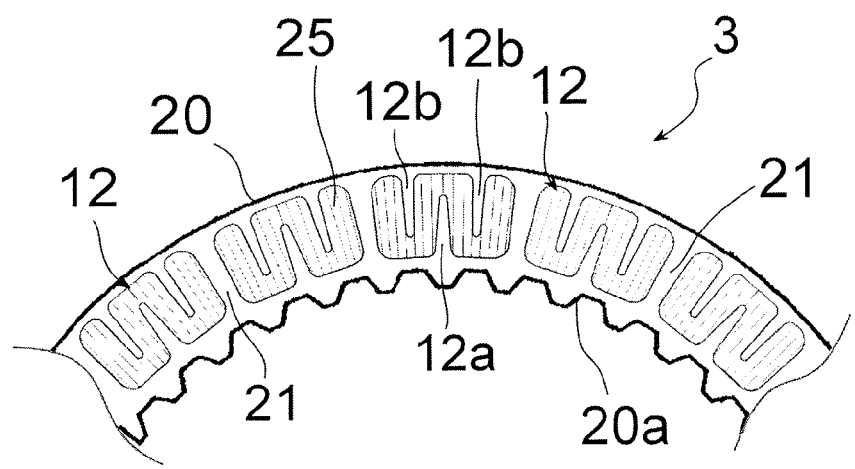
FIG. 2 is a partial front view of the friction plate illustrating a first embodiment of the present invention.

FIG. 2 is a partial front view of a friction plate 3 illustrating a first embodiment of the present invention. The friction plate 3 has a friction surface 25 formed by annularly fixing a plurality of the identical friction material segments 12 onto a surface of a substantially annular core plate 20 in the axial direction by using an adhesive or the like. A spline 20a which engages with a spline 5 of the hub 4 is provided on the inner periphery of the core plate 20. FIG. 2 illustrates the friction plate 3 partially, but the friction material segments 12 are annularly fixed to the core plate 20 at equal intervals and in the omitted portion as well, in a similar manner as that illustrated in FIG. 2.

An oil passage 21 which penetrates from the inner diameter to the outer diameter is defined between the friction material segment 12 and the friction material segment 12. Thus, the friction material segments 12 and the oil passages 21 are alternately disposed in a circumferential direction.

Figure 3:
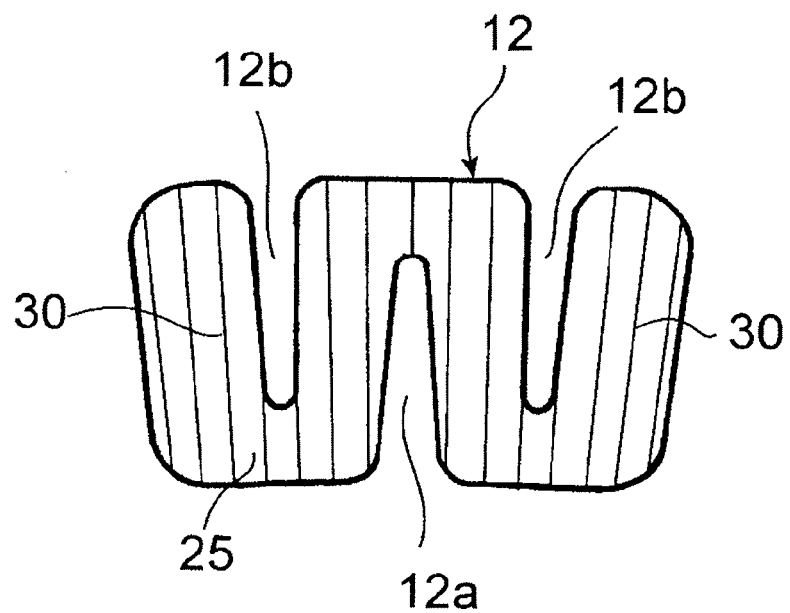
FIG. 3 is a front view illustrating a friction material segment which is used in the friction plate of the first embodiment of the present invention.

FIG. 3 is a front view illustrating the friction material segment 12 which is used in the friction plate of the first embodiment of the present invention. A plurality of minute grooves 30 which extend in the radial direction of the friction material segment 12 are formed on the friction surface (the surface) 25 of the friction material segment 12.

The minute grooves 30 extend radially from the center of the core plate 20 at substantially equal intervals. Furthermore, the minute grooves 30 extend from the inner diameter end to the outer diameter end of the friction material segment 12. In other words, the minute grooves 30 penetrate from the inner diameter end to the outer diameter end of the friction material segment 12.

The width of each minute groove 30 in the circumferential direction is set to range from 10 µm to 1,000 µm. The depth thereof ranges from 10 µm to 300 µm. If the width is less than 10 µm, there is no effect of reducing drag torque, and if the width exceeds 1,000 µm, the friction area of the friction surface 25 of the friction material segment 12 decreases, leading to deterioration of durability.

Furthermore, the depth of each minute groove 30 is set to range from 10 µm to 300 µm. If the depth is less than 10 µm, there is no effect of reducing the drag torque, and if the depth exceeds 300 µm, the strength of the friction material segment 12 is degraded.

The gross area of the minute grooves 30 occupying the friction surface 25 in one friction material segment 12 is set to range from 1% to 20% of the area of the friction surface 25. If the area ratio is less than 1%, there is no effect of reducing the drag torque, and if the area ratio exceeds 20%, the friction properties of the friction plate 3 are deteriorated.

A first oil groove 12a which is open to the inner diameter side and ends inside the friction material segment that is on the outer diameter side, and second oil grooves 12b which are open to the outer diameter side and ends inside the friction material segment 12 that is on the inner diameter side are formed in each friction material segment 12.

The first oil groove 12a is formed substantially in the middle of the friction material segment 12 in the circumferential direction. Furthermore, two of the second oil grooves 12b are formed on both sides in the circumferential direction interposing the first oil groove 12a therebetween. By providing the second oil grooves 12b which are open only to the outer diameter side, oil drawn into the friction surface 25 through the oil passage 21 is smoothly drained to the outer diameter side, and thus, during idle running, it is possible to reduce the drag torque. Particularly, the effect of reducing the drag torque is significant at a low rotation speed range.

Furthermore, by providing the first oil groove 12a which is open to the inner diameter portion while being closed at an end, there is an operation of separating the friction plate 3 and the separator plate 2 from each other. It is thereby effective to achieve uniform clearance between the friction plate 3 and the separator plate 2 during idle running.

(Second Embodiment)

Figure 4:
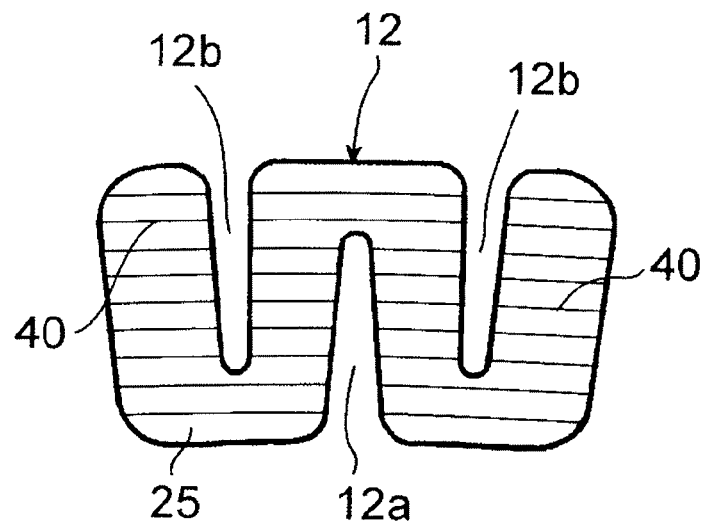
FIG. 4 is a front view illustrating a friction material segment which is used in the friction plate of a second embodiment of the present invention.

FIG. 4 is a front view of an alternate friction material segment 12 which is used in the friction plate of a second embodiment of the present invention. According to the second embodiment, the extending direction of the minute groove formed on the friction surface 25 of the friction material segment 12 is different from that in the first embodiment.

In the second embodiment, a plurality of minute grooves 40 are provided in the friction material segment 12 at equal intervals in the circumferential direction. As is clear in FIG. 4, the minute grooves 40 extend from one end to the other end of the friction material segment 12 in the circumferential direction.

In the second embodiment as well, the width and the depth of each minute groove 40, and the area ratio thereof with respect to the friction surface 25 are set similarly to the case of the first embodiment.

(Third Embodiment)

Figure 5:
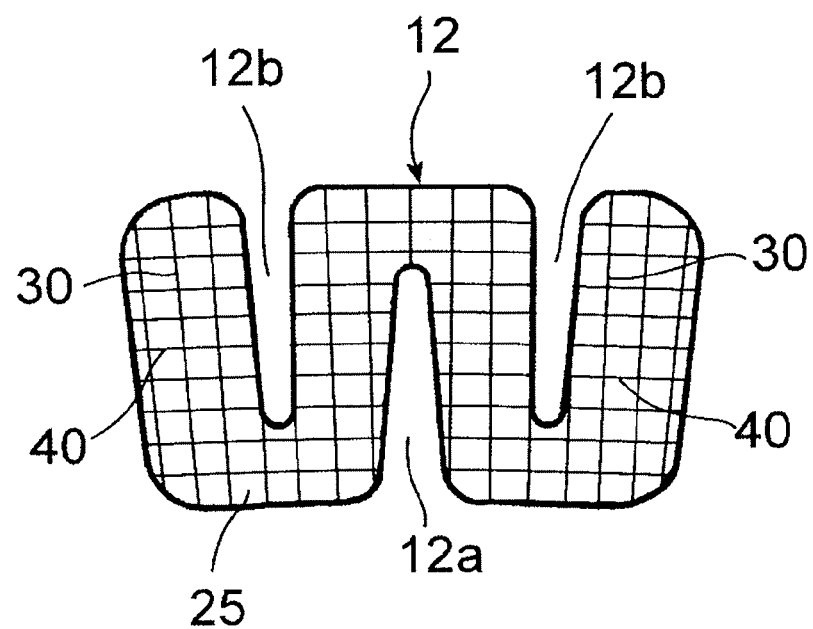
FIG. 5 is a front view illustrating a friction material segment which is used in the friction plate of a third embodiment of the present invention.

FIG. 5 is a front view of another alternate friction material segment 12 which is used in the friction plate of a third embodiment of the present invention. The third embodiment is constituted of a combination of the first embodiment and the second embodiment. The minute grooves 30 extending in the radial direction and the minute grooves 40 extending in the circumferential direction are formed on the friction surface 25 of the friction material segment 12.

According to the third embodiment, since the minute grooves 30 extending in the radial direction at equal intervals and the minute grooves 40 extending in the circumferential direction at equal intervals are formed, the area ratio with respect to the friction surface 25 is higher than those in the first embodiment and the second embodiment. However, a surface oil film is able to be ensured between the friction plate 3 and the separator plate 2. Therefore, fluid shearing resistance is able to be reduced.

As is clear in FIG. 5, the minute grooves 30 extend from the inner diameter end to the outer diameter end of the friction material segment 12, and the minute grooves 40 extend from one end to the other end of the friction material segment 12 in the circumferential direction.

In the third embodiment as well, the width and the depth of each of the minute groove 30 and the minute groove 40, and the area ratio thereof with respect to the friction surface 25 are set similarly to the case of the first embodiment.

As illustrated in the first embodiment, each of the friction material segments 12 of the second embodiment and the third embodiment is fixed to the core plate 20 as illustrated in FIG. 2 so as to constitute the friction plate 3, which is unnecessary to mention.

By forming the minute grooves as described in the embodiments 1 to 3, it is possible to reduce the low rotation speed range of the drag torque in the wet-type multiple-disc clutch more effectively. Furthermore, the number of the minute grooves 30 and 40 is able to be arbitrarily set after a necessary friction area is ensured in the friction surface 25 of the friction material segment 12.

Figure 6:
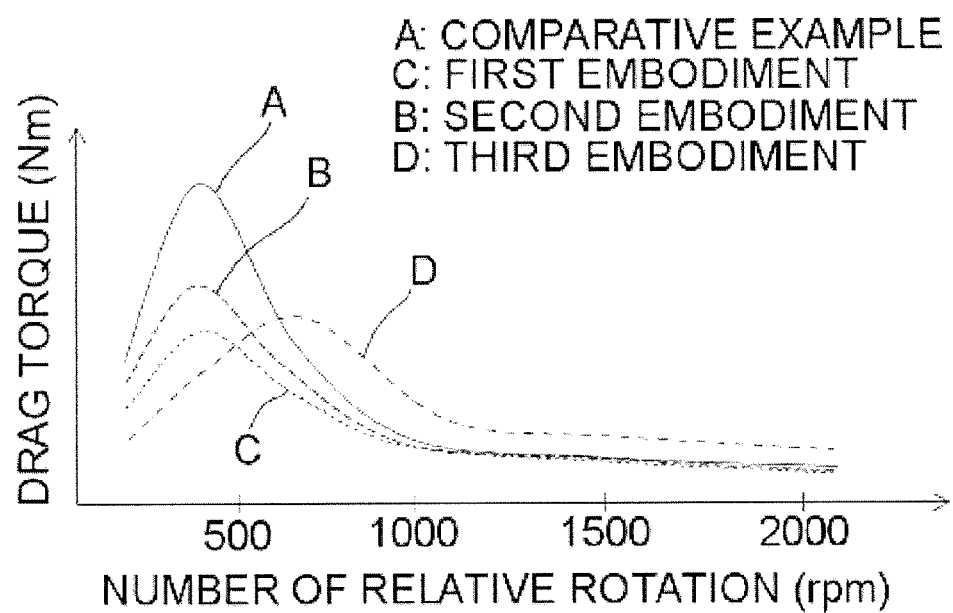
FIG. 6 is a graph illustrating the effects of each of the embodiments and a comparative example (an example in the related art) of the present invention.

FIG. 6 is a graph illustrating the effects of each of the embodiments and a comparative example (an example in the related art) of the present invention. The vertical axis represents the drag torque (Nm), and the horizontal axis represents a number of relative rotation or a relative rotation speed (rpm). In FIG. 6, the shapes of the friction material segments are identical to each other. The curve A indicates the comparative example (the example in the related art) having no minute groove, the curve C indicates the first embodiment illustrated in FIG. 3, the curve B indicates the second embodiment illustrated in FIG. 4, and the curve D indicates the third embodiment illustrated in FIG. 5, respectively. It is seen that the drag torque at the low rotation speed range is able to be remarkably reduced in each of the embodiments provided with the minute grooves, compared to the comparative example.

The present invention described above is not limited to the foregoing embodiments, and it is possible to adopt a shape other than the illustrated shapes as the shape of the friction material segment. It is also possible to adopt the friction material segment having alternate oil grooves which are constituted in a different manner or to adopt the friction material segment having no oil groove.

The above-described present is able to be used in a vehicle and the like in which an automatic transmission is mounted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions thereof.

This application claims the benefit of Japanese Patent Application No. 2014-149484, filed Jul. 23, 2014, which is hereby incorporated by reference herein in its entirety.

What is claimed is:

1. A friction plate comprising:
   a plurality of friction material segments that are annularly fixed to a substantially annular core plate,
   wherein each of the plurality of friction material segments includes:
   a first oil groove that is open at a radially inner edge of the respective friction material segment and terminates within the respective friction material segment;
   a second oil groove that is open at a radially outer edge of the respective friction material segment and terminates within the respective friction material segment; and
   a minute groove formed in a friction surface of the respective friction material segment.

2. The friction plate according to claim 1, wherein each minute groove has a width ranging from 10 μm to 1,000 μm and a depth ranging from 10 μm to 300 μm.

3. The friction plate according to claim 1, wherein each minute groove extends along a radial direction of the core plate.

4. The friction plate according to claim 3, wherein each minute groove extends from the radially inner edge to the radially outer edge of the respective friction material segment.

5. The friction plate according to claim 1, wherein each minute groove extends along a circumferential direction of the core plate.

6. The friction plate according to claim 5, wherein each minute groove has an end spaced from an opposite end thereof along the circumferential direction of the core plate.

7. The friction plate according to claim 5, wherein each friction material segment further includes:
a second minute groove that extends along a radial direction of the core plate.

8. The friction plate according to claim 7, wherein for each friction material segment, the minute groove and the second intersect each other.

9. The friction plate according to claim 1, wherein, for each friction material segment, a gross area of the minute groove ranges from 1% to 20% of a surface area of said friction surface of the respective friction material segment.

10. The friction plate according to claim 1,
wherein each friction material segment further includes a third oil groove that is open at the radially outer edge of the respective friction material segment and terminates within the respective friction material segment, and
the first oil groove is disposed between the second oil groove and the third oil groove along a circumferential direction of the core plate.

11. The friction plate according to the claim 1, wherein each minute groove is open at opposite ends thereof.

12. The friction plate according to claim 1, wherein, for each friction material segment, the minute groove has a width and a depth that are smaller than those of the first and second oil grooves.

13. The friction plate according to claim 1, wherein each minute groove does not extend through a thickness of the respective friction material segment.

14. The friction plate according to claim 13, wherein each minute groove extend from a first edge of the respective friction material segment to an opposite second edge of the respective friction material segment.

15. The friction plate according to claim 14,
wherein said first edge is the radially inner edge of the respective friction material segment and said second edge is the radially outer edge of the respective friction material segment, or
said first and second edges are radially extending edges of the respective friction material segment that are spaced apart from each other along a circumferential direction of the core plate.

16. A wet-type multiple-disc clutch comprising:
a friction plate having a plurality of friction material segments that are annularly fixed to a substantially annular core plate;
separator plates that are disposed with the friction plate between them in an axial direction; and
a piston that fastens the friction plate and the separator plates,
wherein each of the plurality of friction material segments includes:
a first oil groove that is open at a radially inner edge of the respective friction material segment and terminates within the respective friction material segment;
a second oil groove that is open at a radially outer edge of the respective friction material segment and terminates within the respective friction material segment; and
a minute groove formed in a friction surface of the respective friction material segment.

17. A friction plate comprising:
an annular core plate; and
a friction material segment having a first surface fixed to the core plate,
wherein the friction material segment has a plurality of minute grooves formed in a second surface of the friction material segment opposite to said first surface,
each minute groove extends between and is open at opposite edges of the friction material segment,
the friction material segment further has oil grooves, and
each oil groove has an open end a radially inner edge or a radially outer edge of the friction material segment and a closed end between the radially inner and outer edges.

18. The friction plate according to claim 17 wherein said opposite edges are:
the radially inner and outer edges of the friction material segment, or
radially extending edges of the friction material segment that are spaced apart from each other along a circumferential direction of the core plate.

19. The friction plate according to claim 17, wherein each minute groove does not extend through a thickness of the friction material segment.

* * * * *